United States Patent
Jha et al.

(10) Patent No.: US 11,854,062 B2
(45) Date of Patent: Dec. 26, 2023

(54) ORDER FULFILLMENT SYSTEM HAVING DYNAMIC ROUTING

(71) Applicant: Walmart Apollo, LLC, Bentonville, AR (US)

(72) Inventors: Vivek Kumar Jha, Bangalore (IN); Puneet Jolly, Delhi (IN); Vasmi Krishna Korada, Hyderabad (IN); Sourabh Tripathi, Hyderabad (IN); Jainesh Doshi, Mumbai (IN); Dhanesh Kothari, Bangalore (IN); Arush Nagpal, Punjab (IN)

(73) Assignee: Walmart Apollo, LLC, Bentonville, AR (US)

( * ) Notice: Subject to any disclaimer, the term of this patent is extended or adjusted under 35 U.S.C. 154(b) by 1450 days.

(21) Appl. No.: 16/001,848

(22) Filed: Jun. 6, 2018

(65) Prior Publication Data

US 2019/0333130 A1 Oct. 31, 2019

(30) Foreign Application Priority Data

Apr. 25, 2018 (IN) .............................. 201841015623

(51) Int. Cl.
*G06Q 30/0601* (2023.01)
*G06Q 10/0835* (2023.01)
(Continued)

(52) U.S. Cl.
CPC ..... *G06Q 30/0635* (2013.01); *G06F 16/9024* (2019.01); *G06Q 10/08355* (2013.01);
(Continued)

(58) Field of Classification Search
CPC ......... G06Q 30/0635; G06Q 10/08355; G06Q 30/08; G06F 16/9024; G06F 3/04842; H04L 67/18; H04L 67/26
See application file for complete search history.

(56) References Cited

U.S. PATENT DOCUMENTS 8,204,757 B2 6/2012 Carlson et al.
8,972,189 B2 3/2015 Anbalagan et al.
(Continued)

FOREIGN PATENT DOCUMENTS

WO 2014099858 A2 6/2014
WO 2016150531 A1 9/2016
(Continued)

OTHER PUBLICATIONS

Jihang Ye, What's Your Next Move: User Activity Prediction in Location-based Social Networks, 2013, p. 171-173 (Year: 2013).*

(Continued)

*Primary Examiner* — Ibrahim N El-Bathy
(74) *Attorney, Agent, or Firm* — Barta, Jones & Foley, PLLC (57) ABSTRACT

Examples provide order fulfillment that includes receiving an online order from a user. An initial distribution hub for delivery of the order is identified and the order routed from the initial distribution hub to an intermediate hub. A notification of receipt of the order at the intermediate hub is received and a user location is determined. A plurality of options for routing the order to a next hub based on the user location and a cost associated with routing the order to the next hub are identified. The cost is based on a bidding process performed among a plurality of possible hubs to which the order will be routed. The order is routed to the next hub in response to a user confirmation of acceptance of a change in delivery location for the order.

20 Claims, 6 Drawing Sheets

(51) Int. Cl.
  *G06Q 30/08*    (2012.01)
  *G06F 16/901*   (2019.01)
  *H04L 67/52*    (2022.01)
  *H04L 67/55*    (2022.01)
  *G06F 3/04842*  (2022.01)
(52) U.S. Cl.
  CPC ............ *G06Q 30/08* (2013.01); *H04L 67/52* (2022.05); *H04L 67/55* (2022.05); *G06F 3/04842* (2013.01)

(56) References Cited

U.S. PATENT DOCUMENTS

| | | | | |
|---|---|---|---|---|
| 10,891,879 | B1* | 1/2021 | Weresh | G09F 3/0335 |
| 2014/0180959 | A1 | 6/2014 | Gillen et al. | |
| 2014/0324725 | A1 | 10/2014 | Edmonds et al. | |
| 2015/0106296 | A1* | 4/2015 | Robinson | G06F 21/62 |
| | | | | 705/339 |
| 2015/0120094 | A1* | 4/2015 | Kimchi | G01C 21/20 |
| | | | | 701/3 |
| 2015/0161697 | A1 | 6/2015 | Jones et al. | |
| 2015/0193731 | A1* | 7/2015 | Stevens | G06Q 10/083 |
| | | | | 705/26.7 |
| 2015/0227882 | A1* | 8/2015 | Bhatt | G06Q 10/083 |
| | | | | 705/330 |
| 2015/0242811 | A1 | 8/2015 | Gillen et al. | |
| 2016/0171515 | A1* | 6/2016 | Radhakrishnan | G06Q 30/0641 |
| | | | | 705/7.35 |
| 2016/0292798 | A1 | 10/2016 | Berry et al. | |
| 2017/0147964 | A1 | 5/2017 | Kothari et al. | |
| 2017/0147974 | A1 | 5/2017 | Pandey et al. | |
| 2017/0185961 | A1* | 6/2017 | Shiryan | G06Q 10/0838 |
| 2017/0200131 | A1* | 7/2017 | van'T Westeinde | G06Q 10/06311 |
| 2017/0323250 | A1 | 11/2017 | Lindbo et al. | |
| 2017/0372256 | A1* | 12/2017 | Kantor | G08G 5/0043 |
| 2019/0295148 | A1* | 9/2019 | Lefkow | G06Q 10/0833 |

FOREIGN PATENT DOCUMENTS

| | | |
|---|---|---|
| WO | 2016170515 A1 | 10/2016 |
| WO | 2017000014 A1 | 1/2017 |

OTHER PUBLICATIONS

Thomas, Shane, "Written Opinion", International Application No. PCT/US2019/013970, dated May 13, 2019, 8 pages.

Thomas, Shane, "International Search Report", International Application No. PCT/US2019/013970, dated May 13, 2019, 2 pages.

* cited by examiner

ORDER FULFILLMENT SYSTEM HAVING DYNAMIC ROUTING

BACKGROUND

Today's delivery systems for orders placed online are static and do not receive any input from a user once the order is placed. As a result, the likelihood that a customer is unavailable at the delivery address at the time of delivery can increase. Current systems also use a predetermined delivery fulfillment route from the seller to the customer, thus resulting in a static system that can add time and cost to delivery, such as when a customer is not present at the delivery location. For example, the customer has the responsibility to be physically present at the address at the time and day for certain deliveries, which can cause unnecessary inconvenience.

SUMMARY

Examples of the disclosure provide a system for order fulfillment. The system includes at least one processor and at least one memory comprising computer program code. The at least one memory and the computer program code are configured to, with the at least one processor, cause the at least one processor to calculate movement of a user based on a combination of historical data and dynamic data relating to a mobile device of the user, receive from a plurality of delivery hubs a cost associated with delivering an order to the user, and identify a plurality of delivery locations for the order based on the calculated movement of the user and the cost associated with delivering the order to the user by each of the delivery hubs. The at least one memory and the computer program code are further configured to, with the at least one processor, cause the at least one process to further present the plurality of delivery locations to the user, receive a user selection of one delivery location of the plurality of delivery locations, and route the order to the delivery location based on the user selection.

Other examples provide one or more computer storage media having computer-executable instructions stored thereon for fulfilling an order, that, upon execution by a processor, cause the processor to receive an online order from a user, identify an initial distribution hub for delivery of the online order, and route the online order from the initial distribution hub to an intermediate hub. The computer-executable instructions, upon execution by a processor, further cause the processor to receive notification of receipt of the online order at the intermediate hub, determine a user location, and identify a plurality of options for routing the online order to a next hub based on the user location and a cost associated with routing the order to the next hub. The cost is based on a bidding process performed among a plurality of possible hubs to which the order will be routed. The computer-executable instructions, upon execution by a processor, additionally cause the processor route the order to the next hub in response to a user confirmation of acceptance of a change in a delivery location for the order.

Still other examples provide a method order fulfillment that includes receiving an online order from a user, identifying an initial distribution hub for delivery of the order, and routing the order from the initial distribution hub to an intermediate hub. The method further includes receiving notification of receipt of the order at the intermediate hub, determining a user location, and identifying a plurality of options for routing the order to a next hub based on the user location and a cost associated with routing the order to the next hub. The cost is based on a bidding process performed among a plurality of possible hubs to which the order will be routed. The method also includes routing the order to the next hub in response to a user confirmation of acceptance of a change in delivery location for the order.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, examples of the disclosure enable a smart order fulfillment system having a dynamic recommender system that effectively tracks the customer's location at different times and provides a suggested change of the delivery location. In some examples, the smart order fulfillment system utilizes user movement patterns to discover possible alternate delivery address and time slot for fulfilling orders in combination with an associated cost for the delivery. Tracking customer movement patterns through tracking of the customer's mobile device and integrating this information into the decision making process to identify possible alternate delivery locations results in reducing the likelihood of returns due to customer unavailability.

Some examples route a package through the various stages of the order fulfillment process, which can be dynamically changed based on a current or predicted future location of the customer. A bidding scheme between delivery hubs is employed in some examples, wherein the hubs bid amongst each other for the responsibility of fulfilling (delivering) an order. In some examples, each bid corresponds to the cost associated with fulfilling the order at a particular delivery time and address. The cost can be calculated based on numerous factors, including, the hub's current operational load, distance of address from the hub, among other factors. For example, the delivery hubs place bids with a city hub, which decides the best bid and hence, the best delivery hub to which to send the order. In one example, the customer is notified regarding the possibility of delivering the order to a new proposed address, should he or she prefer this alternate delivery location. Based on the customer's choice, the order is routed through the relevant intermediate hubs, and delivered to the customer, which can include dynamic re-routing.

As should be appreciated, the tracking of the user and bidding for delivery of the order can dynamically change over time as the user moves throughout a day. That is, the present disclosure contemplates a delivery scheme that is dynamic with respect to a changing customer movement pattern, thereby resulting in a higher likelihood of the customer being available to receive the delivery of the order at the delivery time slot. An improved experience to customers shopping online is thereby provided, as well as a reduction in the number of returned packages due to customer unavailability. Moreover, the bidding system facilitates delivering the order at a least possible cost (if the customer agrees), which results in cost savings for both the customer and the company.

Figure 1:
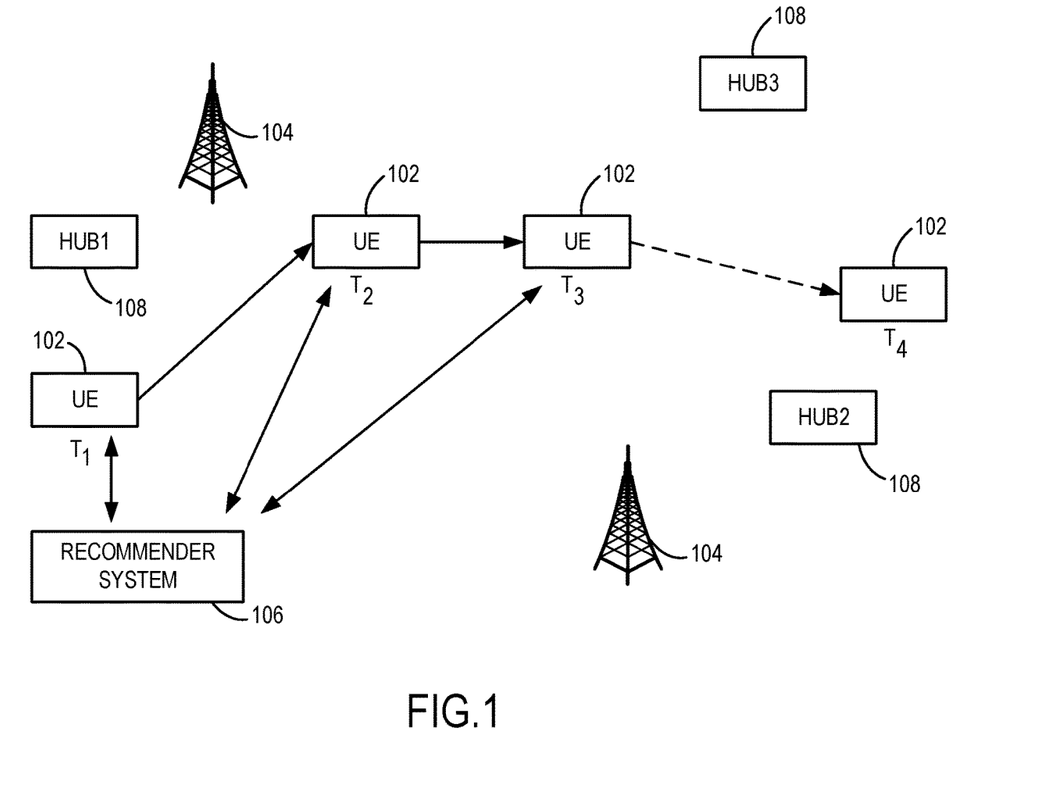
FIG. 1 is an exemplary block diagram illustrating a system for managing order delivery.

FIG. 1 illustrates a system 100 for managing order delivery, including dynamically recommending alternate delivery locations, which in various examples is based on a combination of customer movement and hub bidding. In the illustrated example, the location of user equipment (UE) 102, such as a mobile device (e.g., a smartphone), is tracked over time. The tracking can be performed periodically or continuously and includes determining past, current and predicted future locations of the UE 102 in various examples. In FIG. 1, time T4 corresponds to a predicted future location of the UE 102.

The location of the UE 102, and hence the location of the customer, can be tracked using tracking technology in the art, such as with location reporting from base stations 104, or other communication beacons or structures that can be used for tracking movement of the UE 102. A recommender system 106 receives this location information and based on the known locations of the fulfillment (or delivery) hubs 108 and a bidding process between the hubs 108 as described herein, is configured to recommend alternate locations for delivery of an order to the customer associated with the UE 102. That is, the recommender system 106 can identify and recommend alternate "better" delivery locations to an original user-entered location, thereby resulting in an improved user experience with faster order delivery. The alternate recommended delivery locations can be provided through a user interface of an application loaded on the UE 102.

In one example, the customer/application user gives permissions to share global positioning system (GPS) information, and thus, allows for collecting and tracking location data for the UE 102. Additionally, the company fulfilling the order (which may be the same or different from the company that sold the goods for the order) has an order fulfillment setup, which in some examples includes a warehouse, city level hubs, area level hubs and delivery zones within an area hub as will be described in more detail herein. Thus, the system 100 in some examples is implemented in cities in which an e-commerce company delivers, including having a city hub, and one or more area hubs (e.g., tier-1 cities). However, it should be appreciated that variations and modifications are contemplated that allow for the use of the system 100 in other cities (e.g., tier-2 or 3 cities).

Figure 2:
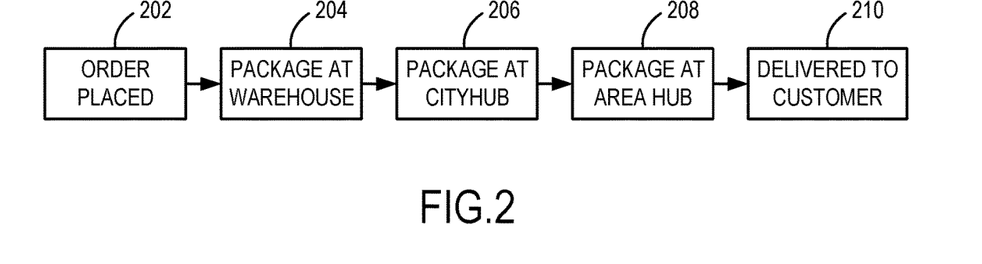
FIG. 2 is an exemplary block diagram illustrating a fulfillment flow.

FIG. 2 illustrates a fulfillment flow 200 corresponding to one or more fulfillment models in which the system 100 can be employed. As should be appreciated, the present disclosure encompasses different fulfillment flows and models and the fulfillment flow 200 is merely for example. Specifically, in the illustrated example, when an order is placed at 202, the package/order is initially present with the third-party seller, or in a warehouse (e.g., an initial hub or initial distribution center) at 204. Thus, in this example, the package/order is not shipped directly from the third-party seller to the customer. However, in some example, the package/order can be shipped directly from the third-party seller.

As can be seen in FIG. 2, two nodes (stages) exist between the warehouse and the customer, referred to herein as hubs. In one example, the hubs exist at two levels, illustrated as the city level and at the area level (within the city). As such, in the fulfillment flow 200, the package/order is transported from the warehouse at 204 to the city hub at 206 and then to an area hub at 208. This flow increases the efficiency level and capacity of the order fulfillment setup, as result of the orders within hubs being able to be grouped by similar delivery locations, or buffered, before being forwarded. In one example, a city hub is a larger hub, which stores and forwards packages/orders to the relevant area hub. The area hub is a smaller hub, such as a delivery hub, responsible for a specific area within a city. The area hub in some examples stores the packages/orders for a defined time period (e.g., two to three days). The area hub is location from which the package/order is delivered to the customer at 210.

It should be noted that a customer in various examples is an online shopping customer who places an online order at an e-commerce site or using an e-commerce application. Thus, the online order is a purchase made online through the e-commerce site or application, which is then fulfilled, including having delivery locations recommended according to the present disclosure.

In one example, the fulfillment flow 200 includes delivery, wherein each city has a hub where all the packages to be delivered in that city are aggregated. Because a city can be large, a city hub sometimes cannot handle every order within the city. Thus, in some examples, for each city hub, there are various area hubs, which handle fulfillment in different mutually exclusive parts of the city as described herein. Thee area hubs in some examples have delivery zones, which define customers in a local vicinity within the area that the area hub handles. In some examples, the delivery zones are smaller areas inside an area hub where all orders that are present within the delivery zone can be delivered in a single trip, depending on the number of orders and size of delivery vehicle. For example, if the number of orders to be delivered in a delivery zone at a particular time slot are high, multiple transport vehicles can deliver orders concurrently in order to timely fulfill the orders. It should be noted that in some example, each transport vehicle makes a single trip to deliver all the orders in that vehicle.

In operation, package/fulfillment processing includes warehouse/third party sellers routing the package to the city hub, which after doing some aggregation/buffering/etc., route the packages to the relevant area hubs. The area hubs deliver the packages to the customers, such as within two to three days. In some examples, no order is stored within the city hub for more than a defined time period (e.g., a week). That is, the city hub acts as a storage/routing center for the packages, and acts as a buffer to store the packages at various stages of the order fulfillment process. It should be noted that additional intermediate hubs may exist within the fulfillment flow.

In some cases, the package/order is returned to the warehouse/seller. This return may be caused by a variety of reasons, such as a problem with the product or because the order could not be fulfilled. The failure to deliver is an order fulfillment setup problem, which can result, for example, from the unavailability of customer at the delivery address (which can include multiple delivery attempts). As should be appreciated, there is an underlying cost associated with each shipped package, specifically cost incurred while routing the package through the city hub/area hub where the package occupies extra space, as well as while transporting the package. If the customer returns the order, this return leads to loss for the e-commerce company for that outlay. Various examples of the present disclosure utilize a smart order fulfillment arrangement that reduces the likelihood of returns due to customer unavailability, by accounting for customer movement while decision making on the routing of the package. That is, dynamic routing using recommended delivery locations (including alternate recommended delivery locations) increases the likelihood of a successful package delivery.

Figure 3:
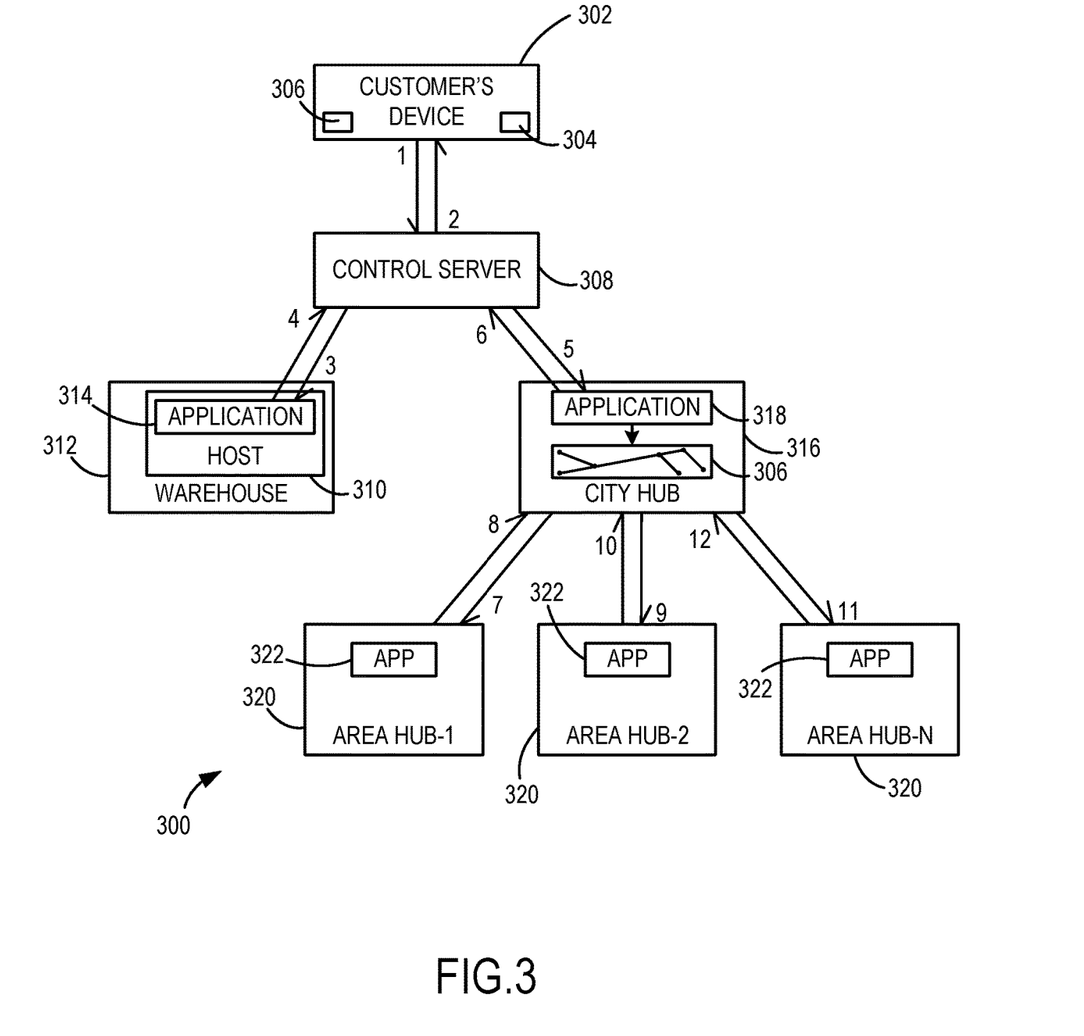
FIG. 3 is an exemplary block diagram illustrating a fulfillment system using cost bidding among multiple hubs.

FIG. 3 illustrates a dynamic fulfillment system 300 in accordance with various examples. The dynamic fulfillment system 300 includes a customer device 302 having an e-commerce application 304 installed thereon. For example, a user has an e-commerce shopping application installed on his or her mobile phone. The user is able to grant the application 304 access to his or her mobile phone's location. As a result, the user's movement information is collected, such as daily, and stored on the user's phone. In one example, this information is stored as a graph 306 (or map in some examples), which can include plural nodes, with each node representing the physical location that the node represents and a list of time slots during which the user was present at that physical location. As should be appreciated, the information may be gathered and configured in any suitable manner and can include additional information as desired or needed. In one example, the graph 306 represents intelligence gathered from the customer movement information.

In the event a user places an order through the e-commerce shopping mobile application 304, his or her role changes to that of a customer. In response to a customer placing the order, the graph 306 stored in the customer's device 302 is sent to a central server 308. It should be noted that the graph 306 can be updated periodically or continuously or upon certain trigger events (e.g., user moves and then stops, or the order is received at a new hub). In some examples, from the time the customer places the order, until the time he or she receives the order, the graph 306 is synced and updated graph information sent to the central server 308. Additionally, in some examples, the data for the graph 306 is overwritten with new location information or reset after, for example, a certain time period (e.g., one week, two weeks, one month, after order fulfillment, etc.).

In one example, the central server 308 is a cloud server. The central server 308 is configured to store the graph 306 for the customer, along with his or her order, and based on the information in the graph 306 (e.g., historical user location or predicted future location), decisions are made and updated at every stage in the order fulfillment setup to thereby dynamically route one or more packages for the order through a plurality of hubs (e.g., the city and area hubs).

In various examples, an e-commerce company implementing the present disclosure has an order fulfillment setup, which includes city level hubs, area level hubs and delivery zones that can be configured and used according to the present disclosure. In these examples, the delivery zones are at a level below the area hub (i.e., the area hub includes multiple delivery zones and are the last component in the supply chain before the customer). In various example, the delivery zones divide the area serviced by the area hub into smaller regions, such that delivery in those regions can occur in constant time and constant cost per trip.

In some examples, the order fulfillment is performed in stages, where each stage transition corresponds to movement of the order from one physical location to another physical location. In one particular example, the fulfillment process is defined by three stages (corresponding to an order fulfillment setup):

Stage 1 (first stage)—order items present in the warehouse.
Stage 2 (second stage)—order items received by the city hub.
Stage 3 (third stage)—order items received by the area hub.

In various examples, after reaching the third stage, transport vehicles leave the area hub to various delivery zones present inside the area hub and fulfill the orders. By the end of the third stage in the order fulfillment process, the order is delivered and received by the customer. Each of the stages will now be discussed in more detail.

At stage 1, the order is still within the warehouse, and is yet to be dispatched. In this first stage of the order fulfillment, the order is shipped from the warehouse to the hub of the city (city hub) in which the order is to be delivered. Before dispatching the order to the city hub, the delivery address, and the customer's current city are matched, for example, by a host computing device 310 at a warehouse 312 having the items to be shipped in the order. In the illustrated example, an e-commerce application 314 at the host computing device 310 communicates with the central server 308 to determine this information.

As a result, if the customer and delivery address are the same, that is, the customer is present in the same city in which the order is to be delivered, the warehouse dispatches the order to the city hub. For example, an order address confirmation is provided and a delivery is initiated from the warehouse. However, if the customer has given an address for delivery, but for example, his or her graph 306 shows that he or she is currently not present in the city where the order will be delivered, in one example, other various options are provided to the customer (e.g., via a user interface of the e-commerce shopping mobile application 304):

1. Deliver to the new current city.
2. Delay the delivery by a defined time period (e.g., two days, three days, etc.).
3. Deliver to the original address.

Additionally, as part of the shipping address confirmation process, an estimated delivery date is communicated to the customer (e.g., via the user interface of the e-commerce shopping mobile application 304) if the order is to be delivered to the new city, so that he or she can make an informed decision regarding delivery location. It should be noted that the address in the new city used for calculating the estimated shipping time is determined from the graph 306, which contains information about, for example, the place(s) where the customer spends the majority of his or her time.

At stage 2, the city hub 316 receives the order items, which also includes receiving the graph 306 of the customer provided by the e-commerce shopping mobile application 304 to an e-commerce application 318 at the city hub 316. In some examples, the city hub 316 (e.g., a server at city hub warehouse) then has the graph 306 of the customer along with the order for every customer. The city hub 316 sends the graph 306 of the user to all the area hubs 320 present in the city, which are received by e-commerce applications 322 at each of the area hubs 320 (e.g., e-commerce applications 322 loaded on servers at the area hubs 320). In one example, all of the area hubs 320 process the information of the graph 306, including to analyze possible locations to which the area hub 320 can deliver.

Because every node in the graph 306 represents a physical location (e.g., address within in the delivery zone of the area hub 320), and the node also contains information regarding the time slots during which the customer was present at the location (e.g., times at which the customer is approachable at that location or likely to be at that location), the area hub 320 is able to determine possible locations and times for delivery for the order. For example, using a probabilistic model or deterministic mathematics, a determination is made as to the possible delivery locations and times for the customer. In some examples, trends or averaging can be used to identify possible locations and corresponding times for delivery.

In one example, for every location and for every time slot the customer is in the location, the area hub 320 calculates the cost at which the area hub 320 can deliver the order to the customer. This cost is part of a bid as described in more detail below.

More specifically, in one example, a bid is defined as follows:

<LOCATION, TIMESLOT, COST>

The bid essentially describes the time and place at which the area hub 320 can deliver the order, as well as the cost the area hub 320 will incur while fulfilling the order. An algorithm for the bidding process is described in more detail below. The area hub 320 considers a variety of factors when deciding the cost incurred by the area hub 320. In some examples, these factors include, but are not limited to:

1. The transport cost involved in delivering the order from the area hub 320 to the customer. This cost can vary for each delivery zone in the area hub 320.
2. The employee time involved in shipping the order. In one example, it is assumed that the average time taken by the employees is constant within the area hub 320, which is determined based on historical data of the time taken by the employees to ship orders (e.g., similar orders, different types of orders, all orders). For simplicity, in some examples, it is assumed that this time is constant for all the area hubs 320.
3. Pending orders already in the queue to be fulfilled for the delivery zone into which the order falls within the area hub 320. This factor essentially defines a current work load for the area hub 320.

It should be noted that other factors may be considered. Thus, in various examples, time-slots in which the user are available in a particular location is used to identify possible delivery locations in combination with other factors, such as load/delivery capacity at the area hub (delivery hub), etc. As such, the customer can be presented with alternate possible locations and provided with delivery options that include delivery time-slots, thereby allowing for faster delivery of the order in a more cost-efficient manner for the provider.

In one example, each area hub 320 returns to the city hub 316 corresponding bids. The city hub 316 receives all the bids from the area hubs 320 and determines the best possible bids amongst all of the bids, for example, by ranking the bids based on customer location and availability in combination with the bids. Every bid corresponds to a particular area hub 320, which ensures delivery of the order to the customer at some location within some time slot. The selection of the best bid can be based on a policy under which the order has to be fulfilled (e.g., whether the order is for priority delivery and faster delivery time is preferred or if a lowest cost incurred for fulfilling the order is the priority). In various examples, the customer (end user) selects between the options available, which is based on a display of the cost and timeslot of delivery to the customer. As described herein, these options are determined based on calculations by the area hubs using criteria, such as whether the order is for priority delivery and a faster delivery time is preferred, or if having the lowest cost incurred for fulfilling the order is the priority. In one example, the e-commerce shopping mobile application 304 displays one or more timeslots for delivery with the cost associated at run time because the area hubs bid on the <LOCATION, TIMESLOT, COST> associated with a particular delivery to a particular location as described herein.

Thus, based on the best bid or bids determined by the city hub 316, the customer is notified of one or more delivery addresses and timeslots corresponding to the bid(s), which may be presented to the customer via the user interface of the e-commerce shopping mobile application 304. Based on whether the customer decides to proceed with the original delivery address, or a new one based on the bids as suggested to the customer, the order is routed to the corresponding area hub 320. It should be noted that the delivery options presented to the user, such as alternate delivery options, in some examples, are provided by in-application push notifications (e.g., notification to select possible alternate delivery locations and time-slot combinations where the system determines that there are better alternate options for delivery). The customer can select from alternate delivery options shown in the application notification, which results in a change in the delivery location and/or time. However, it should be noted that in various examples, the present disclosure attempts to identify better locations along different points of the fulfillment route (e.g., at each of a plurality of intermediate hubs) and sends the customer notifications to determine whether the customer wants to update the delivery location.

Stage 3 is defined by the area hub 320 receiving the order, along with the graph 306 of the user. Based on the bid in which the area hub 320 has to fulfill the order, the area hub 320 processes the order, and dispatches the order to the corresponding delivery zone, which will deliver the order to the customer to the relevant address along with all the other orders that fall inside the delivery zone. If the user is unavailable at the location, redelivery is attempted (e.g., a second delivery attempt the next day). However, if delivery of the order at the time-slot is not possible, or if the customer is unavailable, subsequent redeliveries are attempted in some examples (e.g., delivery attempts over three days). If after a defined maximum number of delivery attempts, the user is still unavailable for delivery, an alternative delivery place and time-slot overlapping with his or her graph 306 is suggested, and delivery of the order is attempted at this new place and time-slot (after receiving user confirmation first). If the customer is still unavailable, such as after a defined number of delivery attempts, the order is returned to the warehouse 312 in some examples.

Figure 4:
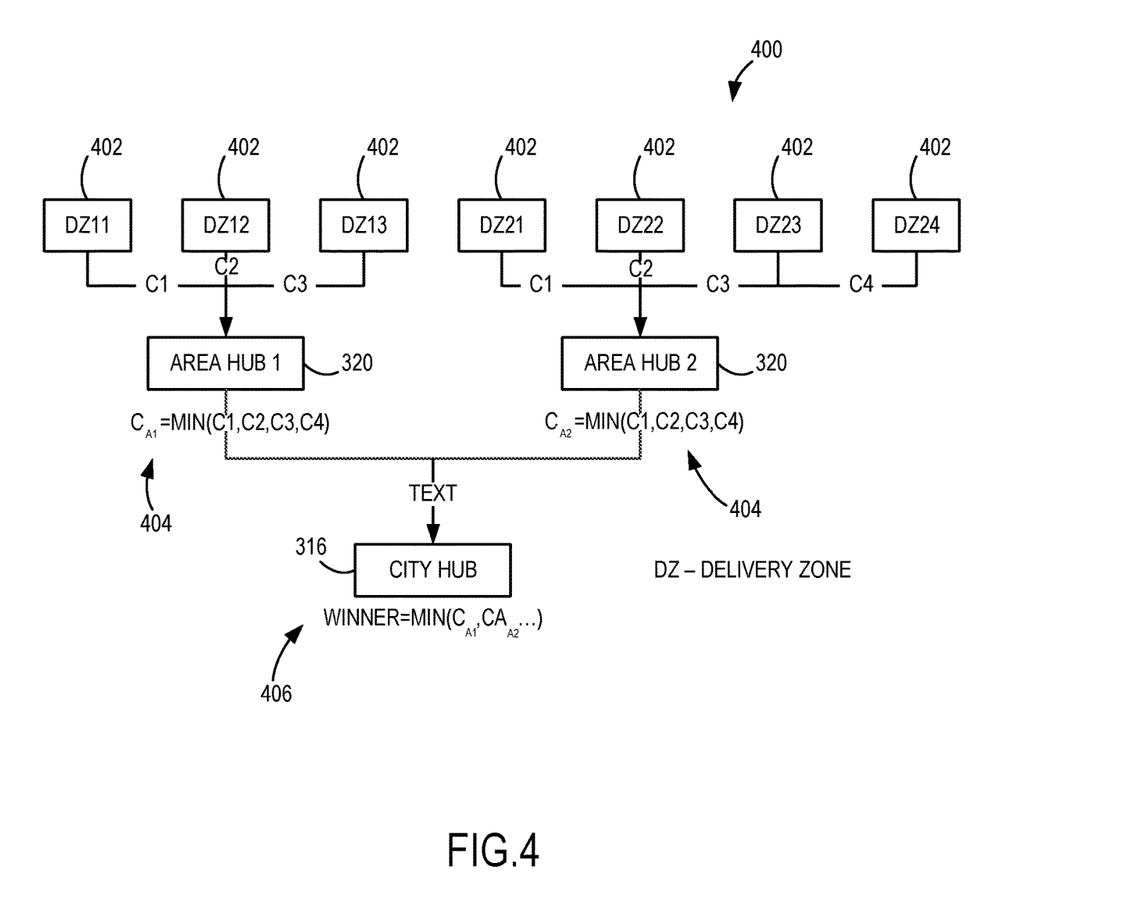
FIG. 4 is an exemplary block diagram illustrating a bidding process.

A bidding system 400 will now be described in connection with a method as illustrated in FIG. 4. It should be noted that the various operations performed by the bidding system 400 (and the method described herein) may be performed in a different order than shown and may be performed simultaneously, concurrently or sequentially. Also, additional or fewer operations can be performed and some operations can be repeated. The operations can be performed locally or remotely at the different components or method steps described herein.

The bidding system 400 is configured to perform a bidding scheme that is used, at least in part, by the recommender system 106 (shown in FIG. 1) to identify and/or recommend delivery locations and time-slots for the order.

More particularly, and with reference also to FIG. 3, the city hub 316 receives order information and the customer's movement patterns as a list of time ranges and the area in which he or she is going to be during that time (e.g. order #28, <9 am-5 pm, area1>, <6 pm-8 pm, area4>, <8 pm-8 am, area6>) based on information in the customer's graph 306.

The city hub 316 uses the movement patterns and requests that the corresponding area hubs 320 calculate the cost to deliver in the respective time ranges (e.g., locally calculate the cost at the area hub 320). The area hubs 320 then analyze the delivery zones 402 associated with the customer movement patterns, runs an algorithm to calculate the cost 404 (C1-C3 for Area Hub 1 and C1-C4 for Area Hub 2) as described herein and return the cost ($C_{A1}$ and $C_{A2}$, respectively), as well as the capacity-usage %, which is communicated to the city hub 316. The city hub 316 uses the bids from the different area hubs 320 to select one or more options, such as a determined best option (e.g., the cheapest option) and forwards the order to the winning area hub 320 for fulfilment (illustrated by the winner 406). In one example, the customer confirms the delivery location and time before the order is sent to the area hub 320 for delivery. It should be noted that in some examples, the area hubs 320 send information regarding cost factors to the city hub 316, which then calculates the cost to deliver for each area hub 320 (instead of this cost being calculated at each of the area hubs 320).

As one particular example, the area hubs 320 are comprised of the delivery zones 402, and the number of these delivery zones 402 in the corresponding area hub 320 is defined such that the cost and time for delivery in that delivery zone 402 is constant per trip (this constant may vary between delivery zones 402). Every delivery zone 402 has a queue per each time-slot defined by when the delivery vehicles leave the area hub 320 for delivery in that particular delivery zone 402. All the orders to be delivered in one or more of the delivery zones 402 in that time interval are placed in the queue for that delivery zone 402 for that time interval. Delivery in the delivery zone 402 is performed by a vehicle and the capacity of that vehicle determines the queue size. For example, if the delivery is done by a vehicle of capacity 50 orders, then the queue size is set at 50. It should be noted that in some examples, the delivery time within a delivery zone 402 is set to a defined time period, such as one hour. Thus, each delivery zone 402 has a queue per hour and all orders to be delivered in the delivery zone 402 in a one hour time interval will be placed in the queue for that delivery zone 402 for that time interval.

In some examples, the cost is calculated based on, in each trip, a defined maximum amount of orders (X) the delivery vehicle can carry with an associated cost (C) for the trip. For simplicity, in this example, it is assumed that all the vehicles for delivery are the same and have a capacity of X and delivery cost of C per trip. Then, the cost of delivering orders in a time interval are:

| Orders | Cost |
|---|---|
| 1 | C |
| 2 | C |
| 3 | C ... |
| X − 1 | C |
| X | C // Capacity of first vehicle is full after this order |
| X + 1 | 2C // A new vehicle has been assigned. As such, the delivery zone 402 has to bear a cost of C + C = 2C, if this order has to be fulfilled |
| X + 2 | 2C ... |

As should be appreciated, the cost of delivery increases if the orders for that delivery exceeds the limit of the transportation vehicle (or the queue for the trip has reached its limit) and in this case to deliver orders in that time slot, an extra vehicle needs to be added.

Thus, in various examples, when the area hub 320 receives a bid request for an order in a particular time range, the following is performed:
 1. Checks to which queue (delivery zone 402) the order belongs.
 2. If the time range for the delivery falls into multiple time-slots (e.g., exceed one hour), then all the possible delivery time-slots are considered and the cost and capacity of the queues is calculated.
 3. The area hub 320 decides the best possible time-slot (or ranks the time-slots) for delivery based on cost and capacity of the queues. In some examples, capacity used in a time-slot can be a tie breaker when the costs are equal for two time-slots. The time-slot with least capacity is selected for load balancing between the time-slots.
 4. The area hub 320 returns the cost and the current capacity of the queue to which the order will be added to the city hub 316.

It should be noted that the above process is performed by the all the area hubs 320 to which the city hub 316 has requested bids in the applicable time slots.

As a result of the bidding process described herein, the city hub 316 has all the information to determine which area hub 320 will fulfil the request. In various examples, the city hub 316 is configured to select the cheapest option or if the customer wants the order at a particular location and at a particular time, the city hub 316 places the order in queues of that particular area hub 320 to which the area belongs (even in this scenario, the cheapest time slot option available can be selected). In various examples, the user's status (priority member example) can be used to select delivery options, which overrides the best cost if the user has preferential status.

Figure 5:
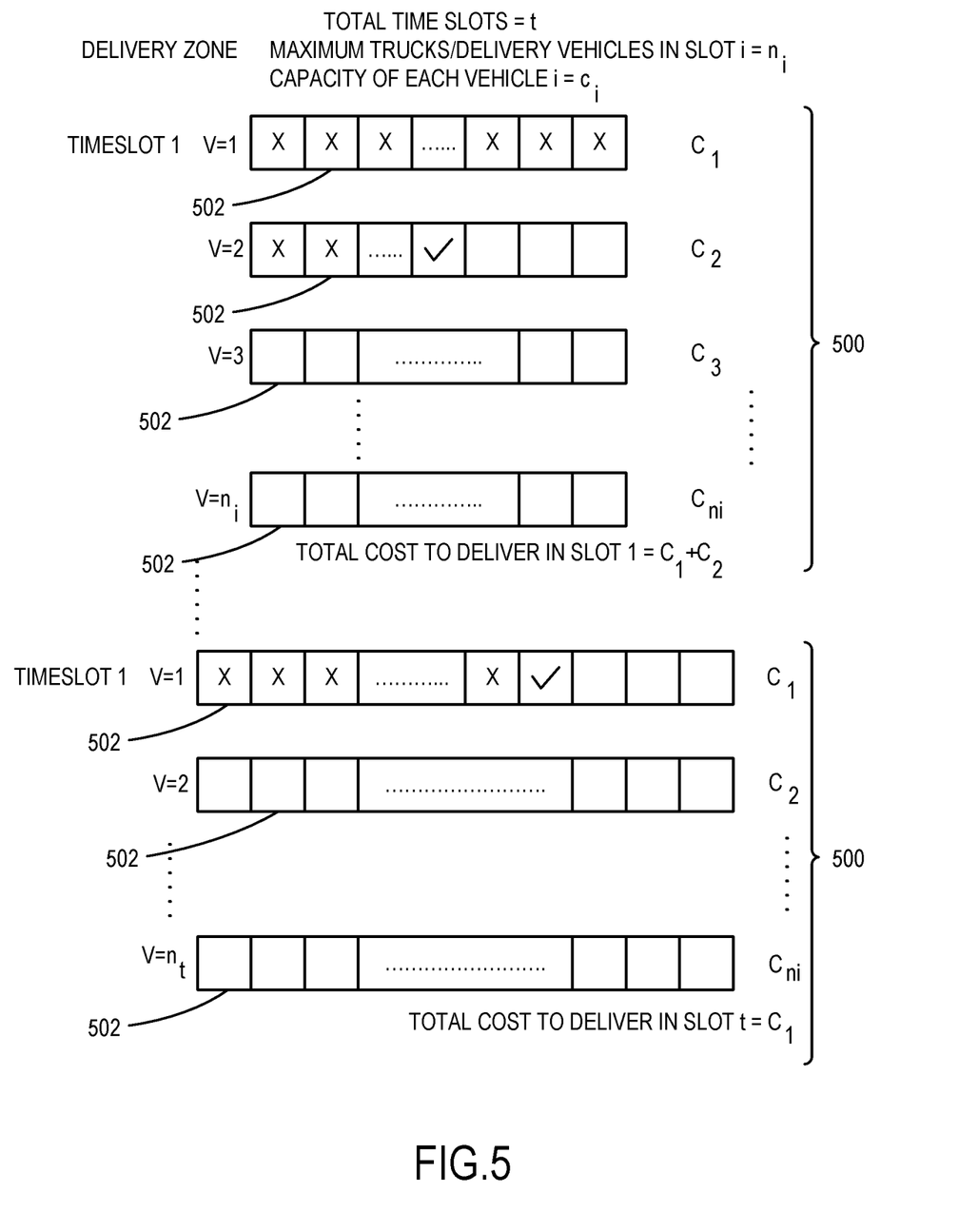
FIG. 5 is an exemplary block diagram illustrating timeslots used in a cost analysis.

With reference now to FIG. 5, the graph 306 (shown in FIG. 3) and order details reach a particular area hub, An with a delivery zone Dm present inside An, and the customer is present in Dm in a timeslot TS. In the illustrated example, there are t time slots 500 (T1, T2, . . . Tt) that fall in the range of TS, and there are t delivery slots 502 at T1, T2, . . . Tt in that area hub 320, to deliver goods to the delivery zone Dm. In time slot T1, there are a maximum of n1 vehicles and in timeslot Tt there are nt vehicles. The cost of delivery by the ith vehicle Vi is Ci.

If in time slot 1, the first vehicle V1 reaches a maximum capacity (this vehicle has a cost C1), and the second vehicle reaches half capacity and can accommodate the current order (this vehicle has a cost of C2), the total cost to deliver is C1+C2. In some examples, the costs of all the time slots from T1 to Tt are calculated and sent to the corresponding area hub 320 as tuples <delivery zone, time slot, cost>. Then, the area hub An selects the delivery zone(s) that best fits the policy, such as per the customer or the cheapest option, and forms a tuple <area hub, time slot, cost>. This process is performed in each area hub 320 and the city hub 316 receives the tuples from each area hub 320 that is within the city hub 320. The city hub 316 routes the order to the winning area hub 320 and the winning area hub 320 delivers the order in the winning delivery zone 402, in the winning time slot. It should be noted that the city hub 316 in some examples maintains a list of the top best options available for delivery (e.g., top three least expensive or fastest delivery options) and asks the user to choose the best option for him or her, and then routes the order accordingly.

The device tracking and order bidding process of various examples results in an improved customer experience because the customer does not have to be concerned with keeping track of delivery and ensuring the customer's presence at the delivery address around the time of delivery. Instead, the e-commerce company can take the responsibility of delivering the order to the customer at a time and place convenient to the customer. Additionally, with the present disclosure, there is a reduced likelihood of return of orders due to customer unavailability, because tracking of the customer's movement is performed until the delivery, and thus the system is aware of the customer's changing location. This results in less scenarios where the cost of shipping is wasted by an unsuccessful delivery. Moreover, a more efficient order fulfillment setup results that is customer aware, thereby allowing dynamic decisions to be made as to the most efficient route to fulfill the order, reducing cost for transporting the goods, as well as increasing customer satisfaction.

Figure 6:
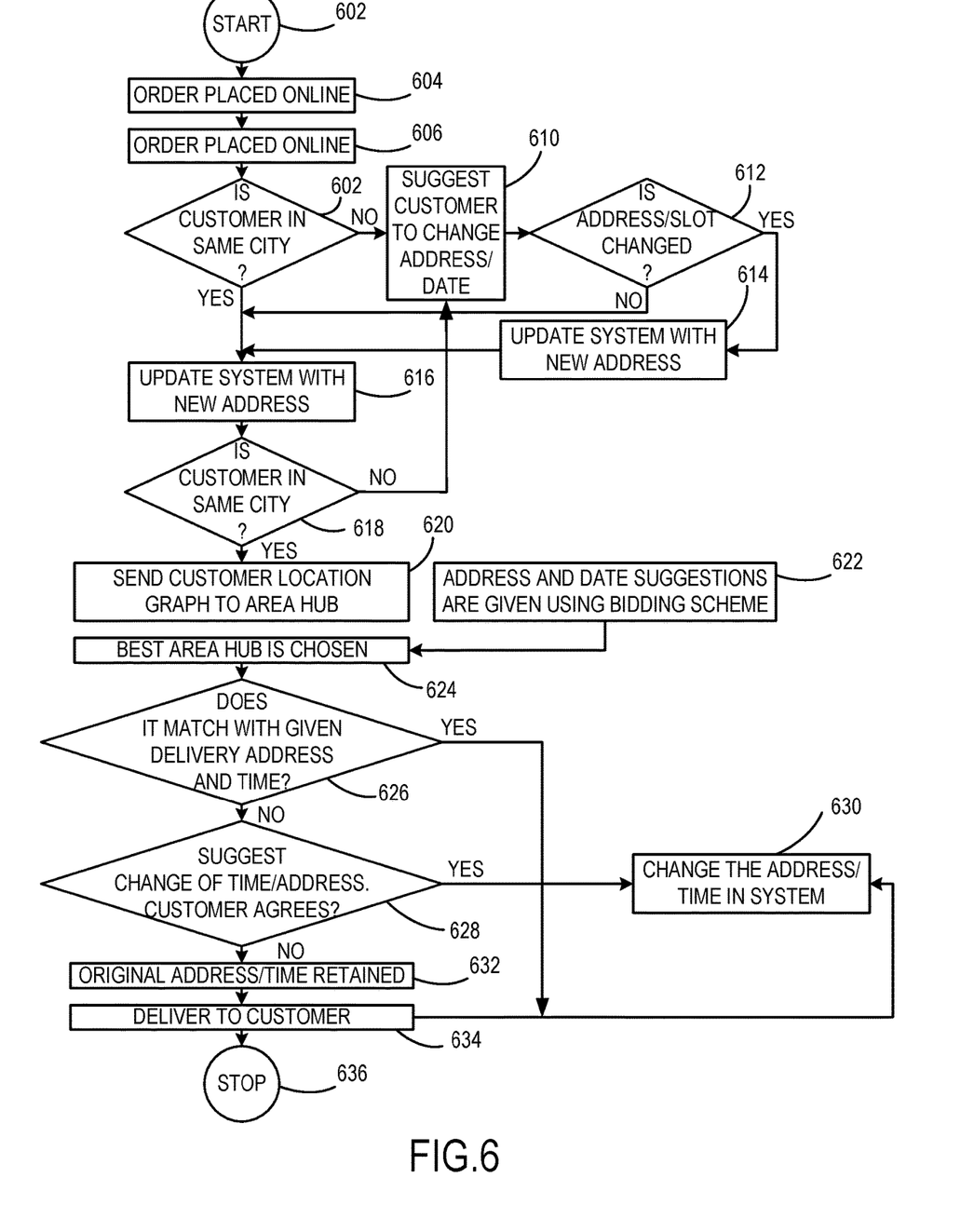
FIG. 6 is an exemplary flowchart illustrating operation of a computing apparatus to perform order fulfillment.

In one example, a smart order fulfillment system performs the processes illustrated in FIG. 6, which transforms the smart order fulfillment system into specialized hardware. User movement patterns are used to discover possible delivery addresses and time-slots for fulfilling orders. For example, by tracking customer movement patterns through mobile devices, and integrating this information in the decision making process, a package is dynamically routed through the various stages of the order fulfillment process.

More particularly, a method 600 begins at 602 and includes receiving an order placed online at 604. For example, an e-commerce application allows a user to order one or more items online for delivery. The e-commerce application can be a company specific application in some examples. With the order placed, the order is packaged in a central hub at 606. For example, a central fulfillment center or distribution center receives the online order and packages the corresponding item(s) for transport and delivery.

A determination is made at 602 whether the customer is in the same city as indicated in the online order. If the customer is not in the same city, such as determined by tracking the user's mobile phone, a suggestion to change the delivery address (and optionally delivery date/time) is made at 610. For example, a proposed new city for delivery corresponding to the customer's current location or predicted future location (within the delivery timeframe) is provided to the customer, such as via the e-commerce shopping mobile application installed on the customer's mobile device (e.g., mobile phone, tablet, laptop computer, etc.).

A determination is then made at 612 whether the address is changed. For example, a determination is made as to whether the customer selected the new proposed city for delivery. If the address is changed, the order delivery address is updated with the new address at 614. Then, if the address is not changed at 610, or if the customer is in the same city as determined at 602, the item(s) packaged for the order are sent to the city per the system address at 616.

During the fulfillment process, including during the various stages of delivery as described herein, a determination is made at 618 whether the customer is in the same city. For example, periodically or continuously, a determination is made whether the customer's mobile device has moved to a different city. In some examples, the movement of the mobile device to a different city triggers a dynamic recommendation for a new location for delivery.

If the customer is not in the same city as determined at 618, then a new address (and optionally delivery date/time) are suggested at 610. It should be noted that the process at 610 to suggest a new delivery city is based on various different factors, including a cost analysis, in some examples. If the customer is in the same city, then the customer's location graph is sent to an area hub at 620. One or more address and date suggestions are given to the customer at 622 using a bidding scheme as discussed herein, such as illustrated in FIG. 4. For example, a cost for delivery of the order for each of the area hubs is determined and as best area hub for delivery is selected at 624. For example, the best area hub for delivery can be selected based on a lowest cost determined from a plurality of cost factors. In some examples, the best area hub for delivery is determined based on user status, such as priority or premium delivery status, wherein the area hub with the shortest time for delivery overrides the area hub with the lowest overall cost. It should be noted the determination of the possibility to change delivery locations is analyzed at multiple times along the fulfillment process, such as at each intermediate delivery hub. Thus, various examples take into account the multiple delivery hubs between the initial distribution center and the last delivery hub.

A determination is made at 626 whether the area hub matches with the given address and delivery time. For example, a determination is made whether the address and delivery time in the order details match with the delivery options for the area hub selected. If the details do not match the delivery options for the selected area hub, then an address and/or time change is suggested at 628 to allow a customer to change the delivery details. If the customer agrees to the change, then the delivery address and/or time is changed in the system (in the order details) at 630. The order is then delivered to the customer at the address and time in the system at 634. Additionally, if the customer does not agree to the change in address and/or time as suggested at 628, then the original address and time are retained in the order details at 632 and the order is delivered at 634. The method 600 then ends at 636, the order having been fulfilled.

Thus, in various examples, each area hub, based on various parameters, such as congestion, distance, cost etc., generates a single bid and the central system (i.e., the city hub) selects the winner. It should be noted that this process is not performed only at a single point in the fulfillment process, but along the way from warehouse to city hub to area hub to the place of delivery (i.e., at multiple points along the fulfillment process stream). In this way, many different fulfillment problems within a hub are considered, down to the availability of the delivery people in the hub etc., which are unknown to the central system.

It should be noted that the smart fulfillment system according to various examples uses a delivery location that is not concerned with a given geographical area. That is, at different times of item transit, the user makes a decision whether to delay delivery, use the old delivery location or the newer proposed location (e.g., alternate delivery locations and/or times), thereby providing an improved user experience. In some examples, the location is determined on basis of the location graph, which is used for recommendation with the actual delivery slot, place and charges always chosen by the user (e.g., end customer). The city or area hub (corresponding to distribution locations in some examples) are selected based on the moving location of the end consumer/customer, and the selection determines the selected area and city hubs. For example, the delivery locations are determined based on the user's availability at a particular location. It should be noted that if there are no possible alternate delivery options, in one example, the order is delivered to the original or default address. In some example, if there is no delivery in the customer's area, the customer is not allowed to place the order online.

It should also be noted that the present disclosure contemplates use in various different applications and environments and is not limited to a warehouse delivery environment or a particular type of movement by the customer. For example, in the case of providing internet access inside an airplane travelling around the globe, communication towers act as the area and city hubs, and the internet data packet is routed to the airplane from a particular source to the moving location of the airplane.

Thus, various examples integrate user awareness in the order fulfillment process. For example, intelligence derived from customer's movement pattern is integrated into the order fulfillment setup, which includes accounting for a user's location, while making decisions on routing of package to the next stage of the order fulfillment setup. User information is constantly modeled in various examples, with the best delivery address to customer tracked dynamically. The best delivery address is also based on a bidding scheme (between area hubs with different delivery zones) in various embodiments, which identifies the best area hub to route the package. As described herein, the best bid is decided in various examples based on company policy (e.g., whether to prioritize delivery timing (customer experience), or route through the lowest cost incurring path (optimally lowest cost or transport)). The area hubs are allowed to factor in a current operational load, capacity to handle the order, commitment to deliver at a particular time slot in a delivery zone, etc., and based on the policy applicable for the order, higher customer satisfaction, or lower cost incurred, or both, are achieved by the present disclosure.

Operational Example

As one example, the present disclosure determines (e.g., calculates) user movement/location based on a combination of historical data and dynamic data. For example, historical data is considered to identify a set of locations where the user is likely to go or often goes and a pattern of past movements is generated that takes into account time spent at each location in order to determine whether to include location as a possible alternate delivery location. In some examples, a threshold time spent at the locations is used to determine if location is added to a map and/or graph of the user's movement pattern (having a range that is configurable).

Dynamic data is determined by capturing GPS data via an application on the user's device in real-time. The dynamic data is compared with historical data to identify whether a user is on a predicted/historical path, or is on a new/ unpredicted path, or on an off-predicted path. For example, a determination is made whether the user going in an expected direction or a new direction, in order to predict where (which location) the user may be going to next. Additionally, time slots are estimated based on historical data (e.g., how long a user is typically at an identified location). Using the above-described information, the map or graph is created of the user's past movements, including timing at each location.

One or more constraints are used in generating the map or graph and suggesting alternate delivery locations. For example, the locations are limited to delivery locations for the company within the delivery zone. Additionally, if a user enters a manual location for delivery, this input creates an override, such that hub load or user movement patterns are not considered as described herein. That is, a user entering a manual location overrides the system recommendations.

In operation, when a user first places an order online, the user provides a delivery address, which prompts the system in various examples to provide alternate delivery location suggestions based on pattern of user movement calculated by the system. Each alternate suggestion includes a time slot. If the user selects one of the alternate locations, a next calculation (re-calculation) is performed when the order reaches the next intermediate location (e.g., hub) to determine if different delivery options should be presented to the user. For example, each time a package is scanned in at an intermediate location (e.g., hub), this action prompts the system to determine the user's current location, compare the location against the expected pattern, select delivery location, time slots, etc. to determine if final delivery is as expected or if re-calculation is needed.

It should be noted that if the system determines two different options for delivery hubs based on user location and time slot, which would provide two different location suggestions, the system takes into account loads on delivery hubs, costs involved for each hub and time slot and location, and also a user status (e.g., priority member vs regular member).

Thus, the system tracks user movement and suggests delivery locations based on a tiered structure that includes a central hub in country, having city hubs below, with multiple area hubs within the city hub, and multiple delivery zones within each area hub. As such, the system can identify, for example, that user will be in area hub A during time slot 8-9 AM and area hub B during time slot 9-11 AM. Using this information and the herein described bidding scheme, wherein the load of the area hub is calculated for each of those time slots, and the particular delivery zone for that time slot, delivery zones are selected to present as options based on the load of the area hubs at those times. As described herein, when calculating the load of the hub and/or zone, the system takes into account other orders in the queue for that zone and time slot, delivery capacity of vehicles in the zone, size of packages (factoring into capacity), delivery times and routes (factoring into capacity), and user status (preferential treatment for priority users).

Additional Examples

A system is provided in one example that includes at least one processor and at least one memory comprising computer program code. The at least one memory and the computer program code are configured to, with the at least one processor, cause the at least one processor to calculate movement of a user based on a combination of historical data and dynamic data relating to a mobile device of the user, receive from a plurality of delivery hubs a cost associated with delivering an order to the user, and identify a plurality of delivery locations for the order based on the calculated movement of the user and the cost associated with delivering the order to the user by each of the delivery hubs. The at least one memory and the computer program code are further configured to, with the at least one processor, cause the at least one process to further present the plurality of delivery locations to the user, receive a user selection of one delivery location of the plurality of delivery locations, and route the order to the delivery location based on the user selection.

In another example, one or more computer storage media having computer-executable instructions stored thereon for fulfilling an order are provided, that, upon execution by a processor, cause the processor to receive an online order from a user, identify an initial distribution hub for delivery of the online order, and route the online order from the initial distribution hub to an intermediate hub. The computer-executable instructions, upon execution by a processor, further cause the processor to receive notification of receipt of the online order at the intermediate hub, determine a user location, and identify a plurality of options for routing the online order to a next hub based on the user location and a cost associated with routing the order to the next hub. The cost is based on a bidding process performed among a plurality of possible hubs to which the order will be routed. The computer-executable instructions, upon execution by a processor, additionally cause the processor route the order to the next hub in response to a user confirmation of acceptance of a change in a delivery location for the order.

In another example, a method order fulfillment is provided that includes receiving an online order from a user, identifying an initial distribution hub for delivery of the order, and routing the order from the initial distribution hub to an intermediate hub. The method further includes receiving notification of receipt of the order at the intermediate hub, determining a user location, and identifying a plurality of options for routing the order to a next hub based on the user location and a cost associated with routing the order to the next hub. The cost is based on a bidding process performed among a plurality of possible hubs to which the order will be routed. The method also includes routing the order to the next hub in response to a user confirmation of acceptance of a change in delivery location for the order.

Alternatively, or in addition to the other examples described herein, examples include a combination of the following:

- identifying the plurality of delivery locations for the order at each of a plurality of different intermediate hubs along a fulfillment route for the order;
- rerouting the order to another delivery location different than the delivery location based on an updated user selection;
- requesting a cost bid from each delivery hub of the plurality of delivery hubs to deliver the order to the user, the cost bids calculated based on an associated cost for delivery in each of a plurality of delivery zones for each delivery hub, each delivery zone of the plurality of delivery zones having a delivery queue with a plurality of time slots, the cost based in part on a current capacity of the delivery queue;
- receiving the cost bids at a city hub to determine one or more alternate delivery locations based on at least one of a cost delivery location option and a least delivery time option;
- providing a push notification to the mobile device of the user indicating the one or more alternate delivery locations;
- providing cost bids including a bid of location, time-slot and cost associated with the delivery of the order based on a current location of the user;
- creating a graph to determine the user location, the graph including a plurality of nodes, with each node of the plurality of nodes representing a physical location and further including a list of time slots during which the user was present at that physical location, and updating the graph based on movement of the user;
- receiving the user confirmation via a user input from an e-commerce shopping mobile application installed on a user's mobile device, and rerouting the order based on the user confirmation;
- suggesting a plurality of alternate delivery locations and time-slots based on the bidding process, the alternate delivery locations ranked based on at least one of cost options and fastest delivery options; and
- providing a plurality of intermediate hubs between the initial hub and a delivery hub and updating the plurality of options for routing the online order when the online order is received at each hub of the plurality of intermediate hubs.

At least a portion of the functionality of the various elements in FIG. 1, FIG. 2, FIG. 3, FIG. 4, and FIG. 5 may be performed by other elements in FIG. 1, FIG. 2, FIG. 3, FIG. 4, and FIG. 5, or an entity (e.g., processor, web service, server, application program, computing device, etc.) not shown in FIG. 1, FIG. 2, FIG. 3, FIG. 4 or FIG. 5.

In some examples, the operations illustrated in FIG. 5 may be implemented as software instructions encoded on a computer-readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

Exemplary Operating Environment

Figure 7:
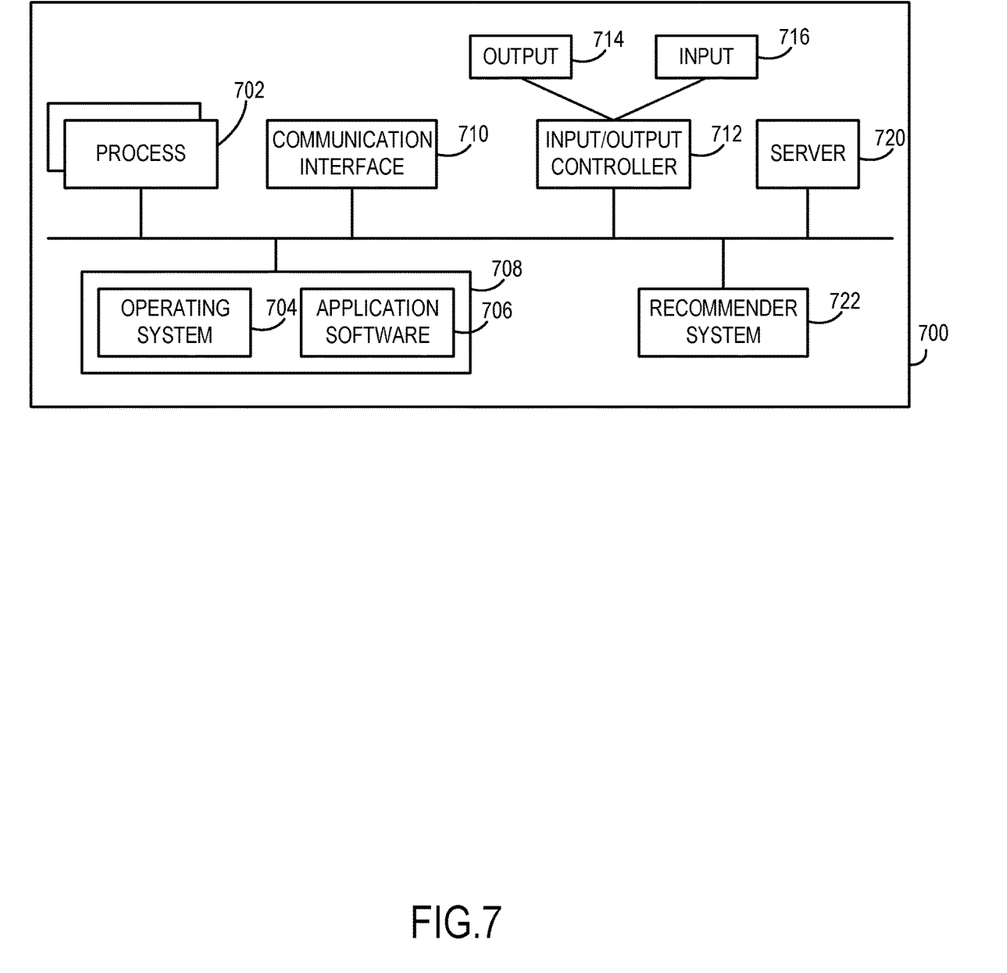
FIG. 7 is an exemplary block diagram illustrating a computing apparatus according to an embodiment as a functional block diagram.

FIG. 7 illustrates a computing apparatus 700 according to an embodiment as a functional block diagram. In an embodiment, components of the computing apparatus 700 may be implemented as a part of an electronic device and/or computing device according to one or more embodiments described in this specification. The computing apparatus 700 comprises one or more processors 702 which may be microprocessors, controllers or any other suitable type of processors for processing computer-executable instructions to control the operation of the electronic device. Platform software comprising an operating system 704 or any other suitable platform software may be provided on the computing apparatus 700 to enable application software 706 to be executed on the computing apparatus 700. According to an embodiment, receiving movement data and cost data, and analyzing the data to determine possible delivery locations may be accomplished by software. Furthermore, the computing apparatus 700 may receive network communications from other computing devices via a network or other type of communication link.

Computer-executable instructions may be provided using any computer-readable media that are accessible by the computing apparatus 700. Computer-readable media may include, for example, computer storage media such as a memory 708 and communications media. Computer storage media, such as a memory 708, include volatile and non-volatile, removable and non-removable media implemented in any method or technology for storage of information such as computer-readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer-readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 708) is shown within the computing apparatus 700, it will be appreciated by a person skilled in the art, that the storage may be distributed or located remotely and accessed via a network or other communication link (e.g. using a communication interface 710).

The computing apparatus 700 may comprise an input/output controller 712 configured to output information to one or more output devices 714, for example a display or a speaker, which may be separate from or integral to the electronic device. The input/output controller 712 may also be configured to receive and process an input from one or more input devices 716, for example, a keyboard, a microphone or a touchpad. In one embodiment, the output device 714 may also act as the input device. An example of such a device may be a touch sensitive display. The input/output controller 712 may also output data to devices other than the output device, e.g. a locally connected printing device.

The computing apparatus 700 also includes a server 720, which may be configured as the central server 308 (shown in FIG. 3). The server 720 is configured in some examples to maintain customer movement information that is provided to hubs operating in a bidding scheme in various examples to allow a recommender system 722 to recommend alternate delivery locations and/or times along the fulfillment route.

The functionality described herein can be performed, at least in part, by one or more hardware logic components. According to an embodiment, the computing apparatus 700 is configured by the program code when executed by the one or more processors 702 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

Although some of the present embodiments may be described and illustrated as being implemented in a client device, server device, personal computer, or the like, these are only examples of a device and not a limitation. As those skilled in the art will appreciate, the present embodiments are suitable for application in a variety of different types of devices, such as conventional computing devices, portable and mobile devices, laptop computers, tablet computers, etc.

Although described in connection with an exemplary computing system environment, examples of the disclosure are capable of implementation with numerous other general purpose or special purpose computing system environments, configurations, or devices.

Any range or device value given herein may be extended or altered without losing the effect sought, as will be apparent to the skilled person.

The embodiments illustrated and described herein as well as embodiments not specifically described herein but within the scope of aspects of the claims constitute exemplary means for processing motion data. The illustrated one or more processors 702 together with the computer program code stored in the memory 708 constitute exemplary processing means for receiving customer movement information and hub cost information to identify and recommend delivery locations and/or times.

Examples of the disclosure may be described in the context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for customized resource-related task allocation. For example, the elements illustrated in FIG. 1, FIG. 3, and FIG. 4 such as when encoded to perform the operations illustrated in FIG. 2, FIG. 5 and FIG. 6 constitute exemplary means for recommending delivery locations and/or times (e.g., alternate delivery locations and/or times) to improve the user's order fulfillment experience.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

The term "comprising" is used in this specification to mean including the feature(s) or act(s) followed thereafter, without excluding the presence of one or more additional features or acts. Furthermore, when introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure is susceptible to various modifications and alternative constructions, certain illustrated examples thereof are shown in the drawings and have been described above in detail. It should be understood, however, that there is no intention to limit the disclosure to the specific forms disclosed, but on the contrary, the intention is to cover all modifications, alternative constructions, and equivalents falling within the spirit and scope of the disclosure.

What is claimed is:

1. A system for order fulfillment, the system comprising:
at least one processor; and
at least one memory comprising computer program code, the at least one memory and the computer program code configured to, with the at least one processor, cause the at least one processor to:
calculate movement of a user based on a combination of historical data and dynamic data determined based on GPS data captured from a mobile device of the user, wherein the historical data includes a pattern of past movements of the user among a plurality of locations and an amount of time spent at each location of the plurality of locations;
determine, for each location of the plurality of locations, whether the user spent a threshold amount of time at the location;
generate a graph including a plurality of nodes, each node representing i) one of the plurality of locations of the mobile device from the dynamic data at which the user spent at least the threshold amount of time, and ii) time slots based on the amount of time spent at each location;
generate, based on the historical data, a prediction of a future location of the user during a particular time slot by extrapolating the generated graph to the predicted future location of the user during the particular time slot;
request a cost bid from each delivery hub of a plurality of delivery hubs to deliver an order from a selected city hub most proximate to the user during the particular time slot, the city hub selected from a plurality of city hubs, the cost bid including a cost associated with delivering the order to the user, a delivery time at which the delivery hub is able to deliver the order, and a delivery location at which the delivery hub is able to deliver the order, wherein the cost bids are calculated based on an associated cost for delivery in each of a plurality of delivery zones for each delivery hub, each delivery zone of the plurality of delivery zones including a delivery queue with a plurality of time slots, wherein the associated cost is based in part on a current capacity of the delivery queue;
receive, from the plurality of delivery hubs, the requested cost bid associated with delivering the order to the user at the predicted future location during the particular time slot;
identify a plurality of delivery locations for the order based on the predicted future location during the particular time slot and the cost associated with delivering the order to the user by each of the delivery hubs;
present the plurality of delivery locations, the cost associated with each delivery location, and the time at which the delivery hub is able to deliver the order to the user in addition to an original delivery location received with the order;
receive a user selection of at least one of the original delivery location or one delivery location of the plurality of delivery locations; and
responsive to receiving the user selection, automatically route the order to the selected delivery location based on the user selection.

2. The system of claim 1, wherein the computer program code is further configured to, with the at least one processor, cause the at least one processor to identify the plurality of delivery locations for the order at each of a plurality of different intermediate hubs along a fulfillment route for the order.

3. The system of claim 2, wherein the computer program code is further configured to, with the at least one processor, cause the at least one processor to reroute the order to another delivery location different than the delivery location based on an updated user selection.

4. The system of claim 1, wherein the computer program code is further configured to, with the at least one processor, cause the at least one processor to:
receive an order address confirmation with the order;
identify, based on the GPS data captured from the mobile device of the user in real-time, a current location of the user;
determine, based on the identified current location of the user and the order address confirmation that the user is currently not present in a city where the order will be delivered; and
generate the graph to provide other delivery options to the user.

5. The system of claim 1, wherein the computer program code is further configured to, with the at least one processor, cause the at least one processor to provide a push notification to the mobile device of the user to present the plurality of delivery locations.

6. The system of claim 4, wherein the computer program code is further configured to, with the at least one processor, cause the at least one processor to, in response to a trigger event, update the generated graph,
wherein the trigger event includes at least one of the mobile device of the user moving and then stopping or the order being received at a new city hub.

7. The system of claim 1, wherein the delivery queue is defined by when a delivery vehicle leaves the delivery hub in the delivery zone.

8. A computer-implemented method for order fulfillment, the computer-implemented method comprising:
calculating movement of a user based on a combination of historical data and dynamic data determined based on GPS data captured from a mobile device of the user, wherein the historical data includes a pattern of past movements of the user among a plurality of locations and an amount of time spent at each location of the plurality of locations;
determining, for each location of the plurality of locations, whether the user spent a threshold amount of time at the location;
generating a graph including a plurality of nodes, each node representing i) one of the plurality of locations of the mobile device from the dynamic data at which the user spent at least the threshold amount of time, and ii) time slots based on the amount of time spent at each location;

generating, based on the historical data, a prediction of a future location of the user during a particular time slot by extrapolating the generated graph to the predicted future location of the user during the particular time slot;

requesting a cost bid from each delivery hub of a plurality of delivery hubs to deliver an order from a selected city hub most proximate to the user during the particular time slot, the city hub selected from a plurality of city hubs, the cost bid including a cost associated with delivering the order to the user, a delivery time at which the delivery hub is able to deliver the order, and a delivery location at which the delivery hub is able to deliver the order, wherein the cost bids are calculated based on an associated cost for delivery in each of a plurality of delivery zones for each delivery hub, each delivery zone of the plurality of delivery zones including a delivery queue with a plurality of time slots, wherein the associated cost is based in part on a current capacity of the delivery queue;

receiving, from the plurality of delivery hubs, the requested cost bid associated with delivering the order to the user at the predicted future location during the particular time slot;

identifying a plurality of delivery locations for the order based on the predicted future location during the particular time slot and the cost associated with delivering the order to the user by each of the delivery hubs;

presenting the plurality of delivery locations, the cost associated with each delivery location, and the time at which the delivery hub is able to deliver the order to the user in addition to an original delivery location received with the order;

receiving a user selection of at least one of the original delivery location or one delivery location of the plurality of delivery locations; and responsive to receiving the user selection, automatically routing the order to the selected delivery location based on the user selection.

9. The computer-implemented method of claim 8, further comprising identifying the plurality of delivery locations for the order at each of a plurality of different intermediate hubs along a fulfillment route for the order.

10. The computer-implemented method of claim 9, further comprising rerouting the order to another delivery location different than the delivery location based on an updated user selection.

11. The computer-implemented method of claim 8, further comprising:
receiving an order address confirmation with the order;
identifying, based on the GPS data captured from the mobile device of the user in real-time, a current location of the user;
determining, based on the identified current location of the user and the order address confirmation that the user is currently not present in a city where the order will be delivered; and
generating the graph to provide other delivery options to the user.

12. The computer-implemented method of claim 8, further comprising:
providing a push notification to the mobile device of the user to present the plurality of delivery locations.

13. The computer-implemented method of claim 11, further comprising:
in response to a trigger event, updating the generated graph, wherein the trigger event includes at least one of the mobile device of the user moving and then stopping or the order being received at a new city hub.

14. The computer-implemented method of claim 8, wherein the delivery queue is defined by when a delivery vehicle leaves the delivery hub in the delivery zone.

15. A computer-readable medium storing instructions for order fulfillment that, when executed by a processor, cause the processor to:
calculate movement of a user based on a combination of historical data and dynamic data determined based on GPS data captured from a mobile device of the user, wherein the historical data includes a pattern of past movements of the user among a plurality of locations and an amount of time spent at each location of the plurality of locations;

determine, for each location of the plurality of locations, whether the user spent a threshold amount of time at the location;

generate a graph including a plurality of nodes, each node representing i) one of the plurality of locations of the mobile device from the dynamic data at which the user spent at least the threshold amount of time, and ii) time slots based on the amount of time spent at each location;

generate, based on the historical data, a prediction of a future location of the user during a particular time slot by extrapolating the generated graph to the predicted future location of the user during the particular time slot;

request a cost bid from each delivery hub of a plurality of delivery hubs to deliver an order from a selected city hub most proximate to the user during the particular time slot, the city hub selected from a plurality of city hubs, the cost bid including a cost associated with delivering the order to the user, a delivery time at which the delivery hub is able to deliver the order, and a delivery location at which the delivery hub is able to deliver the order, wherein the cost bids are calculated based on an associated cost for delivery in each of a plurality of delivery zones for each delivery hub, each delivery zone of the plurality of delivery zones including a delivery queue with a plurality of time slots, wherein the associated cost is based in part on a current capacity of the delivery queue;

receive, from the plurality of delivery hubs, the requested cost bid associated with delivering the order to the user at the predicted future location during the particular time slot;

identify a plurality of delivery locations for the order based on the predicted future location during the particular time slot and the cost associated with delivering the order to the user by each of the delivery hubs;

present the plurality of delivery locations, the cost associated with each delivery location, and the time at which the delivery hub is able to deliver the order to the user in addition to an original delivery location received with the order;

receive a user selection of at least one of the original delivery location or one delivery location of the plurality of delivery locations; and responsive to receiving the user selection, automatically route the order to the selected delivery location based on the user selection.

16. The computer-readable medium of claim 15, further storing instructions that, when executed by the processor, cause the processor to:
   identify the plurality of delivery locations for the order at each of a plurality of different intermediate hubs along a fulfillment route for the order.

17. The computer-readable medium of claim 15, further storing instructions that, when executed by the processor, cause the processor to:
   receive an order address confirmation with the order;
   identify, based on the GPS data captured from the mobile device of the user in real-time, a current location of the user;
   determine, based on the identified current location of the user and the order address confirmation that the user is currently not present in a city where the order will be delivered; and
   generate the graph to provide other delivery options to the user.

18. The computer-readable medium of claim 15, further storing instructions that, when executed by the processor, cause the processor to:
   provide a push notification to the mobile device of the user to present the plurality of delivery locations.

19. The computer-readable medium of claim 15, further storing instructions that, when executed by the processor, cause the processor to:
   in response to a trigger event, update the generated graph, wherein the trigger event includes at least one of the mobile device of the user moving and then stopping or the order being received at a new city hub.

20. The computer-readable medium of claim 15, wherein the delivery queue is defined by when a delivery vehicle leaves the delivery hub in the delivery zone.

* * * * *